(12) United States Patent
Yang et al.

(10) Patent No.: US 11,057,483 B2
(45) Date of Patent: Jul. 6, 2021

(54) USER TRACKING METHOD, SERVER, AND CLIENT

(71) Applicant: CHINA UNIONPAY CO., LTD., Shanghai (CN)

(72) Inventors: Yang Yang, Shanghai (CN); Zhou Chen, Shanghai (CN); Haoran Zhu, Shanghai (CN); Zili Huang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 16/958,781

(22) PCT Filed: Oct. 10, 2018

(86) PCT No.: PCT/CN2018/109659
§ 371 (c)(1),
(2) Date: Jun. 29, 2020

(87) PCT Pub. No.: WO2019/128378
PCT Pub. Date: Jul. 4, 2019

(65) Prior Publication Data
US 2020/0329112 A1  Oct. 15, 2020

(30) Foreign Application Priority Data
Dec. 29, 2017 (CN) .......................... 201711486762.7

(51) Int. Cl.
*H04L 29/08* (2006.01)
*H04L 29/06* (2006.01)

(52) U.S. Cl.
CPC .............. *H04L 67/22* (2013.01); *H04L 63/08* (2013.01); *H04L 67/02* (2013.01); *H04L 67/42* (2013.01)

(58) Field of Classification Search
CPC ..... H04L 63/0807; H04L 67/02; H04L 67/22; H04L 63/105; G06F 21/31
See application file for complete search history.

(56) References Cited

U.S. PATENT DOCUMENTS 6,014,698 A   1/2000  Griffiths
6,073,175 A   6/2000  Tavs
(Continued)

FOREIGN PATENT DOCUMENTS

CN    1794656 A    6/2006
CN   101860540 A   10/2010
(Continued)

OTHER PUBLICATIONS

International Search Report for corresponding Application No. PCT/CN2018/109659, dated Dec. 28, 2018.
(Continued)

*Primary Examiner* — Shean Tokuta
(74) *Attorney, Agent, or Firm* — Renner, Otto, Boisselle & Sklar, LLP (57) ABSTRACT

In embodiments, a server receives an HTTP protocol-based access request sent by the client; when the server determines that the access request comprises a preset identifier and the current identifier value corresponding to the preset identifier matches any of historical identifier values in a historical identifier set stored in the server, the server determines a user seed from the historical identifier set according to the current identifier value, the historical identifier set comprising a corresponding relationship between historical identifier values and user seeds, the any of historical identifier values being generated by the server on the basis of a user seed and a random number corresponding to the historical identifier value, and the user seed being used for identifying a same (Continued)

user recognized by the server on the basis of the access request; the server tracks an access behavior of the user seed.

14 Claims, 4 Drawing Sheets

(56) References Cited

U.S. PATENT DOCUMENTS

| | | | |
|---|---|---|---|
| 6,078,956 A | 6/2000 | Bryant | |
| 6,584,454 B1* | 6/2003 | Hummel, Jr. | G06F 21/6218 705/1.1 |
| 7,668,954 B1* | 2/2010 | Melvin | H04L 63/10 709/224 |
| 8,392,963 B2* | 3/2013 | Shulman | H04L 63/08 726/2 |
| 8,606,900 B1* | 12/2013 | Levergood | H04L 63/10 709/224 |
| 9,444,824 B1* | 9/2016 | Balazs | H04L 63/08 |
| 2006/0095526 A1* | 5/2006 | Levergood | G06Q 30/06 709/206 |
| 2006/0136564 A1 | 6/2006 | Ambrose | |
| 2012/0290830 A1* | 11/2012 | Resch | H04L 9/0841 713/150 |
| 2013/0246609 A1* | 9/2013 | Topchy | G06F 16/957 709/224 |
| 2014/0337930 A1* | 11/2014 | Hoyos | G06F 21/34 726/4 |
| 2015/0351068 A1* | 12/2015 | Deleeuw | H04L 67/18 455/456.1 |
| 2017/0180495 A1* | 6/2017 | Comstock | H04L 67/02 |
| 2017/0289185 A1* | 10/2017 | Mandyam | H04L 63/0245 |
| 2017/0289197 A1* | 10/2017 | Mandyam | H04L 63/06 |
| 2017/0329957 A1* | 11/2017 | Vepa | G06F 21/34 |
| 2019/0149990 A1* | 5/2019 | Wang | H04W 8/08 370/329 |
| 2019/0349426 A1* | 11/2019 | Smith | H04W 84/22 |
| 2019/0363889 A1* | 11/2019 | Wang | H04L 9/0643 |
| 2019/0387401 A1* | 12/2019 | Liao | H04W 12/082 |

FOREIGN PATENT DOCUMENTS

| | | |
|---|---|---|
| CN | 101945102 A | 1/2011 |
| CN | 102194177 A | 9/2011 |
| CN | 104639387 A | 5/2015 |
| CN | 104717079 A | 6/2015 |
| CN | 105743988 A | 7/2016 |
| CN | 106599107 A | 4/2017 |
| CN | 108234642 A | 6/2018 |
| KR | 100341110 B1 | 6/2002 |

OTHER PUBLICATIONS

Written Opinion for corresponding Application No. PCT/CN2018/109659, dated Dec. 28, 2018.

* cited by examiner

USER TRACKING METHOD, SERVER, AND CLIENT

The present application is a national phase entry under 35 U.S.C. § 371 of International Application No. PCT/CN2018/109659, filed on Oct. 10, 2018, which claims the priority from Chinese Patent Application No. 201711486762.7, filed with the Chinese Patent Office on Dec. 29, 2017 and entitled "User Tracking Method, Server, and Client", which is hereby incorporated by reference in its entirety.

FIELD

Embodiments of the invention relate to the field of information collection, and in particular, to a user tracking method, a server, and a client.

BACKGROUND

With the development of Internet technologies, after a user accesses a server, the server will track the user's online behavior in order to provide the user with personalized services. In the prior art, the user is usually tracked by using Cookies. Cookies can read and save the user information, and then the user is tracked according to the relevant information saved by the Cookies.

In the prior art, the tracking of the user' activity is performed based on the relevant information of the Cookies. When an attacker or a crawler obtains the relevant information of the Cookies, it may falsify the information and falsify the accessing of the user, thus causing the server to fail to track the user's behavior accurately.

SUMMARY

Embodiments of the invention provide a user tracking method, a server, and a client, so as to improve the accuracy of tracking the user access behavior.

An embodiment of the invention provides a user tracking method. The method includes: a server receives an HTTP protocol-based access request sent by a client; when the server determines that the access request includes a preset identifier and that a current identifier value corresponding to the preset identifier matches with any historical identifier value in a historical identifier set stored by the server, the server determines a user seed from the historical identifier set according to the current identifier value, where the historical identifier set includes a correspondence between historical identifier values and user seeds. Any historical identifier value is generated by the server based on a user seed corresponding to the historical identifier value and a random number, and the user seed is used to identify a same user recognized by the server based on the access request; and tracking, by the server, an access behavior of the user seed.

Optionally, after the server receives the access request sent by the client, the method further includes: when the server determines that the preset identifier is not included in the access request or the current identifier value corresponding to the preset identifier mismatches with any historical identifier value in the historical identifier set, the server generates a new user seed randomly for the access request; the server generates a historical identifier value of the user seed based on the user seed and a random number; the server adds the user seed and the historical identifier value to the historical identifier set; and the server sends an access response to the client, where the access response carries the preset identifier, the historical identifier value and the new user seed, and the historical identifier value is a value of the preset identifier.

Optionally, that the server tracks an access behavior of the user seed, includes: the server obtains risk control information of the user seed, where the risk control information is obtained according to historical access requests and a current access request; and the server determines a risk value of the access request of the user seed according to the risk control information.

Optionally, after the server determines the risk value of the access request of the user seed according to the risk control information, the method further includes: the server generates a random number when determining that the risk value is not greater than a risk threshold; the server calculates the random number and the user seed according to a preset algorithm to obtain a new historical identifier value corresponding to the preset identifier, where the preset algorithm satisfies: calculated identifier values are not repetitive, and seeds and random numbers cannot be inversely derived from identifier values; and the server sends an access response to the client, wherein the access response carries the preset identifier and the historical identifier value, and the historical identifier value is a value of the preset identifier.

Optionally, before the server sends the new identifier value to the client, the method further includes: the server sends a program for verifying legality of the server to the client, where the program includes: calculating a random number and a user seed according to a preset algorithm to obtain an identifier value corresponding to the preset identifier.

An embodiment of the invention provides a user tracking method. The method includes: a client receives an access response corresponding to a historical access request sent by a server, where the access response carries a preset identifier and a historical identifier value, and the historical identifier value is a value of the preset identifier; and the client sends an HTTP protocol-based access request to the server, where the access request includes the preset identifier and a current identifier value corresponding to the preset identifier, and the current identifier value corresponding to the preset identifier is the historical identifier value.

Optionally, after the client receives the access response and before the client sends the HTTP protocol-based access request to the server, the method further includes: the client receives a program for verifying legality of the server sent by the server, where the program includes: calculating a random number and a user seed according to a preset algorithm to obtain an identifier value corresponding to a preset identifier; the client runs the program to obtain a new identifier value of the preset identifier; and the client verifies that the server is legal when determining that the new identifier value is same as the received historical identifier value.

An embodiment of the invention provides a user tracking server. The server includes: a receiving unit configured to receive an HTTP protocol-based access request sent by a client; a processing unit configured to: when determining that the access request includes a preset identifier and that a current identifier value corresponding to the preset identifier matches with any historical identifier value in a historical identifier set stored by the server, determine a user seed from the historical identifier set according to the current identifier value, where the historical identifier set includes a correspondence between historical identifier values and user seeds, any historical identifier value is generated by the server based on a user seed corresponding to the historical identifier value and a random number, and the user seed is used to identify a same user recognized by the server based on the access request; and a tracking unit configured to track an access behavior of the user seed.

Optionally, the processing unit is further configured to: when determining that the preset identifier is not included in the access request or the current identifier value corresponding to the preset identifier mismatches with any historical identifier value in the historical identifier set, generate a new user seed randomly for the access request; generate a historical identifier value of the user seed based on the user seed and a random number; and add the user seed and the historical identifier value to the historical identifier set; the server further includes a sending unit configured to: send an access response to the client, where the access response carries the preset identifier, the historical identifier value and the new user seed, and the historical identifier value is a value of the preset identifier.

Optionally, the processing unit is configured to: obtain risk control information of the user seed, where the risk control information is obtained according to historical access requests and a current access request; and determine a risk value of the access request of the user seed according to the risk control information.

Optionally, the processing unit is further configured to: generate a random number when determining that the risk value is not greater than a risk threshold; and calculate the random number and the user seed according to a preset algorithm to obtain a new historical identifier value corresponding to the preset identifier, wherein the preset algorithm satisfies: calculated identifier values are not repetitive, and seeds and random numbers cannot be inversely derived from identifier values; the sending unit is configured to: send an access response to the client, wherein the access response carries the preset identifier and the historical identifier value, and the historical identifier value is a value of the preset identifier.

Optionally, the sending unit is further configured to: send a program for verifying legality of the server to the client, wherein the program includes: calculating a random number and a user seed according to a preset algorithm to obtain an identifier value corresponding to a preset identifier.

An embodiment of the invention provides a user tracking client. The client includes: a receiving unit configured to receive an access response corresponding to a historical access request sent by a server, where the access response carries a preset identifier and a historical identifier value, and the historical identifier value is a value of the preset identifier; and a sending unit configured to send an HTTP protocol-based access request to the server, wherein the access request includes the preset identifier and a current identifier value corresponding to the preset identifier, and the current identifier value corresponding to the preset identifier is the historical identifier value.

Optionally, the receiving unit is further configured to: receive a program for verifying legality of the server sent by the server, wherein the program includes: calculating a random number and a user seed according to a preset algorithm to obtain an identifier value corresponding to a preset identifier; the client further includes a processing unit configured to: run the program to obtain a new identifier value of the preset identifier; and verify that the server is legal when determining that the new identifier value is same as the received historical identifier value.

An embodiment of the present application provides a computer readable storage medium storing the computer executable instructions which are configured to cause the computer to perform the above-mentioned methods.

An embodiment of the invention provides a computer device including: a memory configured to store program instructions; and a processor configured to invoke the program instructions stored in the memory, and perform the above-mentioned methods in accordance with the obtained program.

An embodiment of the invention provides a computer program product including a computer program stored on a non-transitory computer readable storage medium, where the computer program includes the computer executable instructions that, when executed by a computer, cause the computer to perform the user tracking methods provided by the embodiments of the invention.

In the embodiments of the invention, when the server receives the HTTP protocol-based access request sent by the client and determines that the access request includes the preset identifier and the current identifier value corresponding to the preset identifier matches with any historical identifier value in the historical identifier set stored by the server, the server determines a user seed from the historical identifier set according to the current identifier value, where the historical identifier set includes the correspondence between historical identifier values and user seeds, and any historical identifier value is generated by the server based on the user seed corresponding to the historical identifier and a random number. Since the identifier value is generated based on the seed and the random number, the generated historical identifier value is also unique. An attacker cannot capture the identifier value, and it is difficult to falsify the user seed and thus difficult to falsify the access behavior of the user seed. Further, the user seed is used to identify the same user recognized by the server based on the access request, so the access behavior of the user corresponding to the user seed can be determined accurately by tracking the access behavior of the user seed.

BRIEF DESCRIPTION OF THE DRAWINGS

In order to illustrate the technical solutions in the embodiments of the invention more clearly, the accompanying figures which need to be used in describing the embodiments will be introduced below briefly. Obviously the accompanying figures described below are only some embodiments of the invention, and other accompanying figures can also be obtained by those ordinary skilled in the art according to these accompanying figures without creative labor.

DETAILED DESCRIPTION OF THE EMBODIMENTS

In order to make the objects, technical solutions and advantages of the invention clearer, the invention will be further illustrated below in details with reference to the accompanying drawings. Obviously the described embodiments are a part of the embodiments of the invention but not all the embodiments. Based upon the embodiments of the invention, all of other embodiments obtained by those ordinary skilled in the art without creative work pertain to the protection scope of the invention.

Figure 1:
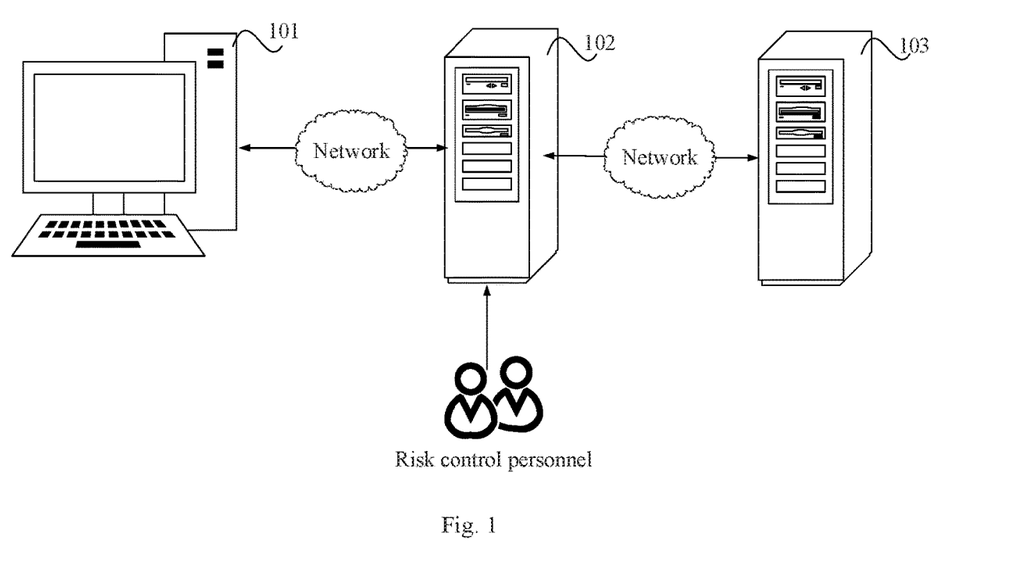
FIG. 1 is a schematic diagram of a communication system architecture provided by an embodiment of the invention.

FIG. 1 shows a schematic diagram of a communication system architecture applying the embodiments of the invention. As shown in FIG. 1, the system architecture may include a client 101, a server 102 and an application server 103. The client 101 and the server 102, or the server 102 and the application server 103 may be connected in a wireless or wired way.

The client 101 may be any user who accesses the application server through a browser or a third-party application. The third-party application may be an application program (APP for short) or the like.

The server 102 is configured to receive the access request sent by the client 101 to the application server 103, and the access response sent by the application server 103 to the client 101. The server 102 may implement the tracking of the activity of the user through the access request and the access response. The program used by the client 101 to verify the legality of the server 102 is stored on the server 102. The server 102 may be deployed between the client 101 and the application server 103, that is, deployed at the exit of the Internet, and may obtain all access requests and all access responses passing through this exit. The server 102 may also be deployed in a bypass manner, and the data exchanged between the client 101 and the application server 103 is forwarded to the server 102 through a switch. The server 102 may be a network device for communicating with the client 101 or the application server 103.

The application server 103 stores the resources that the client 101 needs to access. The application server 103 may be a network device for communicating with the client 101. The application server 103 includes the server corresponding to the APP or the server corresponding to the World Wide Web (WEB).

In an embodiment of the invention, the server and the client may agree on the form of the preset identifier in advance.

Figure 2:
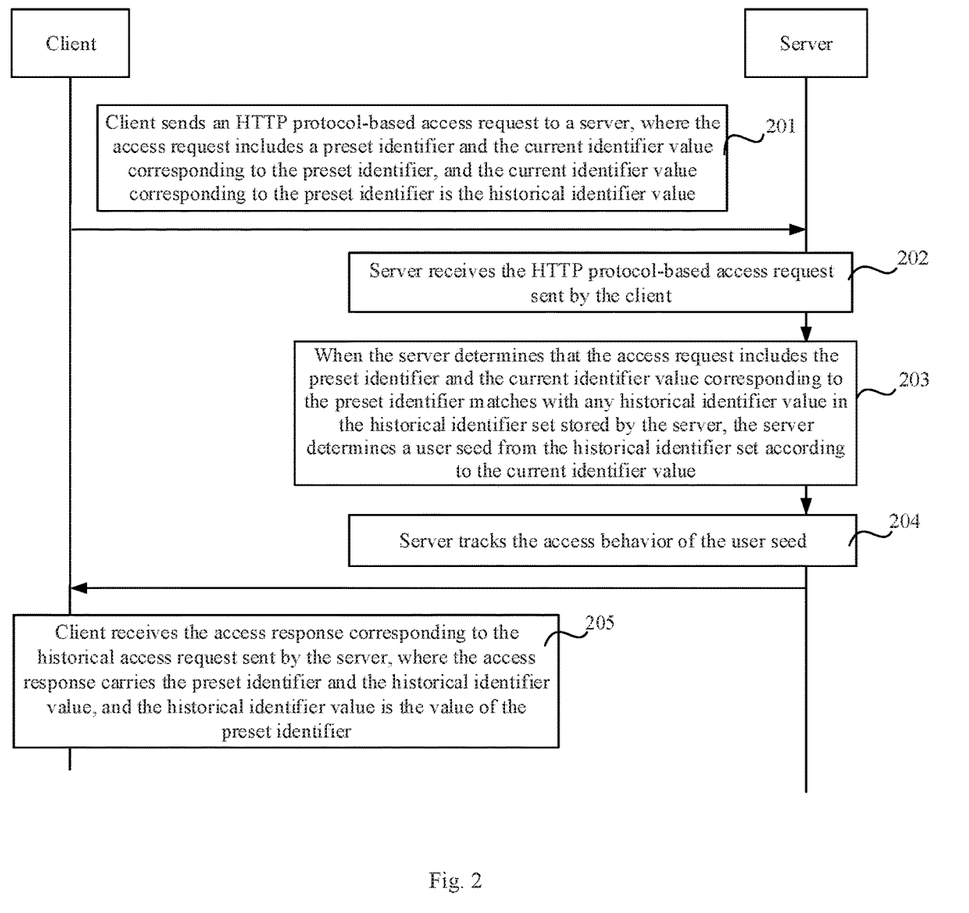
FIG. 2 is a schematic flow diagram of a user tracking method provided by an embodiment of the invention.

Based on the system architecture shown in FIG. 1, FIG. 2 exemplarily illustrates a schematic flow diagram of a user tracking method provided by an embodiment of the invention. As shown in FIG. 2, the user tracking method includes the following steps.

Step 201: a client sends an HTTP protocol-based access request to a server, where the access request includes a preset identifier and the current identifier value corresponding to the preset identifier, and the current identifier value corresponding to the preset identifier is the historical identifier value.

Step 202: the server receives the HTTP protocol-based access request sent by the client.

Step 203: in response to determining that the access request includes the preset identifier and the current identifier value corresponding to the preset identifier matches with one historical identifier value in the historical identifier set stored by the server, the server determines a user seed from the historical identifier set according to the current identifier value. Here the historical identifier set includes the correspondence between historical identifier values and user seeds. A historical identifier value is generated by the server based on the user seed corresponding to the historical identifier value and a random number, and the user seed is used to identify the same user recognized by the server based on the access request.

Step 204: the server tracks the access behavior of the user seed.

Step 205: the client receives the access response corresponding to the historical access request sent by the server, where the access response carries the preset identifier and the historical identifier value, and the historical identifier value is the value of the preset identifier.

In the embodiments of the invention, when the server receives the HTTP protocol-based access request sent by the client and determines that the access request includes the preset identifier and the current identifier value corresponding to the preset identifier matches with any historical identifier value in the historical identifier set stored by the server, the server determines a user seed from the historical identifier set according to the current identifier value. Here the historical identifier set includes the correspondence between historical identifier values and user seeds, and any historical identifier value is generated by the server based on the user seed corresponding to the historical identifier and a random number. Since the identifier value is generated based on the seed and the random number, the generated historical identifier value is also unique. An attacker cannot capture the identifier value, and it is difficult to falsify the user seed and thus difficult to falsify the access behavior of the user seed. Further, the user seed is used to identify the same user recognized by the server based on the access request, so the access behavior of the user corresponding to the user seed can be determined accurately by tracking the access behavior of the user seed.

In an embodiment of the invention, the access request is based on the HTTP protocol, that is, the form of the access request is the HTTP form. The preset identifier may be set in the HTTP-based header, so that the information of the application layer may not be affected and the client is easy to read the preset identifier. It is possible to implement the tracking of the activity of the user in the same tracking way in two different access modes of World Wide Web (WEB) or terminal application, and it is not necessary to distinguish between the WEB access and the terminal application access. The format of the preset identifier may be T-FLAG-R=**********, where the value following the equal sign is the identifier value corresponding to the preset identifier.

In an embodiment of the invention, the historical identifier set is stored in the server, and the historical identifier set includes the correspondence between historical identifier values and user seeds. To simplify the process, only the information about the latest access request of each user may be stored in the historical identifier set. As shown in Table 1, the preset identifiers in Table 1 are predefined.

TABLE 1

| History identifier set | | |
|---|---|---|
| T-FLAG-S | T-FLAG-R | T-FLAG-C |
| $S_0$ | $R_0$ | $C_0$ |

In Table 1, T-FLAG-S represents the user seed, $S_0$ represents the value of the user seed, $S_0$=2e2324da-2c34-401c-b079-f652de8161e4; T-FLAG-R represents the preset identifier, $R_0$ represents the value of the preset identifier, $R_0$=d658adf9006c19ef9519881a6eb5cd4b8920effa; T-FLAG-C represents the random number generated during the current access; $C_0$ represents the specific random number, $C_0$=9b52c54e-2545-4725-9ad2-bbf6501b5214.

In response to receiving the HTTP protocol-based access request sent by the client, the server firstly determines whether the HTTP header contains the preset identifier; if so, then determines the current identifier value corresponding to the preset identifier. In an embodiment of the invention, the server determines whether the HTTP protocol-based access request contains the preset identifier, so the server may perform the tracking no matter whether the access request is from a static interface or a dynamic interface.

In an embodiment of the invention, when a user sends an HTTP protocol-based access request to the server for the first time, the HTTP header corresponding to the access request does not include the preset identifier. In an embodiment of the invention, after the server receives the access request sent by the client, the method further includes: when the server determines that the preset identifier is not included in the access request or the current identifier value corresponding to the preset identifier mismatches with any historical identifier value in the historical identifier set, the server generates a new user seed randomly for the access request; the server generates the historical identifier value of the user seed based on the user seed and a random number; the server adds the user seed and the historical identifier value to the historical identifier set; and then the server sends an access response to the client, where the access response carries the preset identifier, the historical identifier value and the new user seed, and the historical identifier value is the value of the preset identifier.

In an embodiment of the invention, when the server determines that the preset identifier is not included in the access request or the current identifier value corresponding to the preset identifier mismatches with any historical identifier value in the historical identifier set (which indicates that the server receives the user's access request for the first time), the server generates a new user seed randomly for the access request, facilitating the server to track the access behavior of the user corresponding to the new user seed.

In an embodiment of the invention, when the client receives a new user seed for the first time, the new user seed is stored locally at the client.

In an embodiment of the invention, the access behavior includes multiple types, such as the risk situation of the access, the interests of the access, and the like. In an embodiment of the invention, the access risk is taken as an example for illustration. A risk control personnel may set the corresponding risk control rule and risk control information according to specific situations.

In an embodiment of the invention, the server tracks the access behavior of the user seed, which includes: the server obtains the risk control information of the user seed, where the risk control information is obtained according to the historical access requests and the current access request; and the server determines the risk value of the access request of the user seed according to the risk control information.

An embodiment of the invention provides a specific implementation of determining the risk of the access request of the user seed. It is assumed that the risk control information includes access time, access interface, access frequency, and total number of accesses. The server determines the first access time, first access interface, first access frequency, and first total number of accesses (which may be the latest number of accesses plus one) corresponding to the current access request; and determines the second access time, second access interface, second access frequency, and second total number of accesses corresponding to the historical access request. The risk control rule is: when it is determined that the difference between the first access time and the second access time is greater than the time threshold, the risk value increases by a first preset value; and/or, when the server determines that the first access interface does not belong to the white list and is not the next access interface to which the second access interface jumps, the risk value increases by a second preset value; and/or, when it is determined that the first access frequency is greater than the frequency threshold, the risk value increases by a third preset value; and/or, when it is determined that the first total number of accesses is greater than the fourth threshold, the risk value increases by a fourth preset value; and the sum of the risk value, the first preset value, the second preset value, the third preset value and the fourth preset value is determined as the risk value of the current access request.

Optionally, when there are two or more clients, the control information may further add the information such as Internet Protocol (IP), User Agent (UA) and the like.

In an embodiment of the invention, when the server determines that the preset identifier is not included in the access request or the current identifier value corresponding to the preset identifier mismatches with any historical identifier value in the historical identifier set (which indicates that the user corresponding to this access accesses for the first time), there is a certain risk, and a preset value is added to the risk value.

In an embodiment of the invention, after the server determines the risk value of the access request of the user seed according to the risk control information, the method further includes: the server generates a random number when determining that the risk value is not greater than the risk threshold, where the form of the random number conforms to the security industry standard; the server calculates the random number and the user seed according to a preset algorithm to obtain a new historical identifier value corresponding to the preset identifier, where the preset algorithm satisfies: the calculated identifier values are not repetitive, and the seeds and random numbers cannot be inversely derived from the identifier values; and the server sends an access response to the client, where the access response carries the preset identifier and the historical identifier value, and the historical identifier value is the value of the preset identifier.

In an embodiment of the invention, if the server determines that the risk value is not greater than the risk threshold, it forwards the corresponding access request to the application server for subsequent service processing. The application server sends the processing result to the server after processing the service. The server updates the historical risk control information with the risk control information corresponding to the current access request according to the setting information from the risk control personnel.

In an embodiment of the invention, if the server determines that the risk value is greater than the risk threshold, it terminates the communication, that is, the server does not forward the access request to the application server, which can improve the security of the application server.

In an embodiment of the invention, the preset algorithm may be $R=HmacSHA1(S, C)$; where $R$ is the identifier value corresponding to the preset identifier, $S$ represents the user seed, and $C$ represents the random number.

In an embodiment of the invention, the server generates a new historical identifier value corresponding to the preset identifier, and the server sends an access response carrying the preset identifier and the historical identifier value to the client. Optionally, the program for verifying the legality sent by the server to the client may be carried when the server sends the access response to the client.

Optionally, before the server sends the new identifier value to the client, the method further includes: the server sends the program for verifying the legality of the server to the client, where the program includes: calculating the random number and the user seed according to the preset algorithm to obtain the identifier value corresponding to the preset identifier.

Accordingly, the client receives the program for verifying legality of the server sent by the server, where the program includes: calculating the random number and the user seed according to the preset algorithm to obtain the identifier value corresponding to the preset identifier; the client runs the program to obtain a new identifier value of the preset identifier; and the client verifies that the server is legal when determining that the new identifier value is same as the received historical identifier value.

Optionally, if the client determines that the new identifier value is different from the received historical identifier value, the client determines that the server communicating with it is illegal, interrupts the current connection, and prompts the user.

In an embodiment of the invention, when the client is an APP, the program including the calculation of the random number and the user seed according to the preset algorithm to obtain the identifier value corresponding to the preset identifier may be assembled in the SDK. The program can be embedded in the APP when the APP is developed.

In an embodiment of the invention, when the client communicates with the server next time, the saved identifier value is put into the HTTP header of the access request and sent to the server along with the access request, proceeding to the next process.

Figure 3:
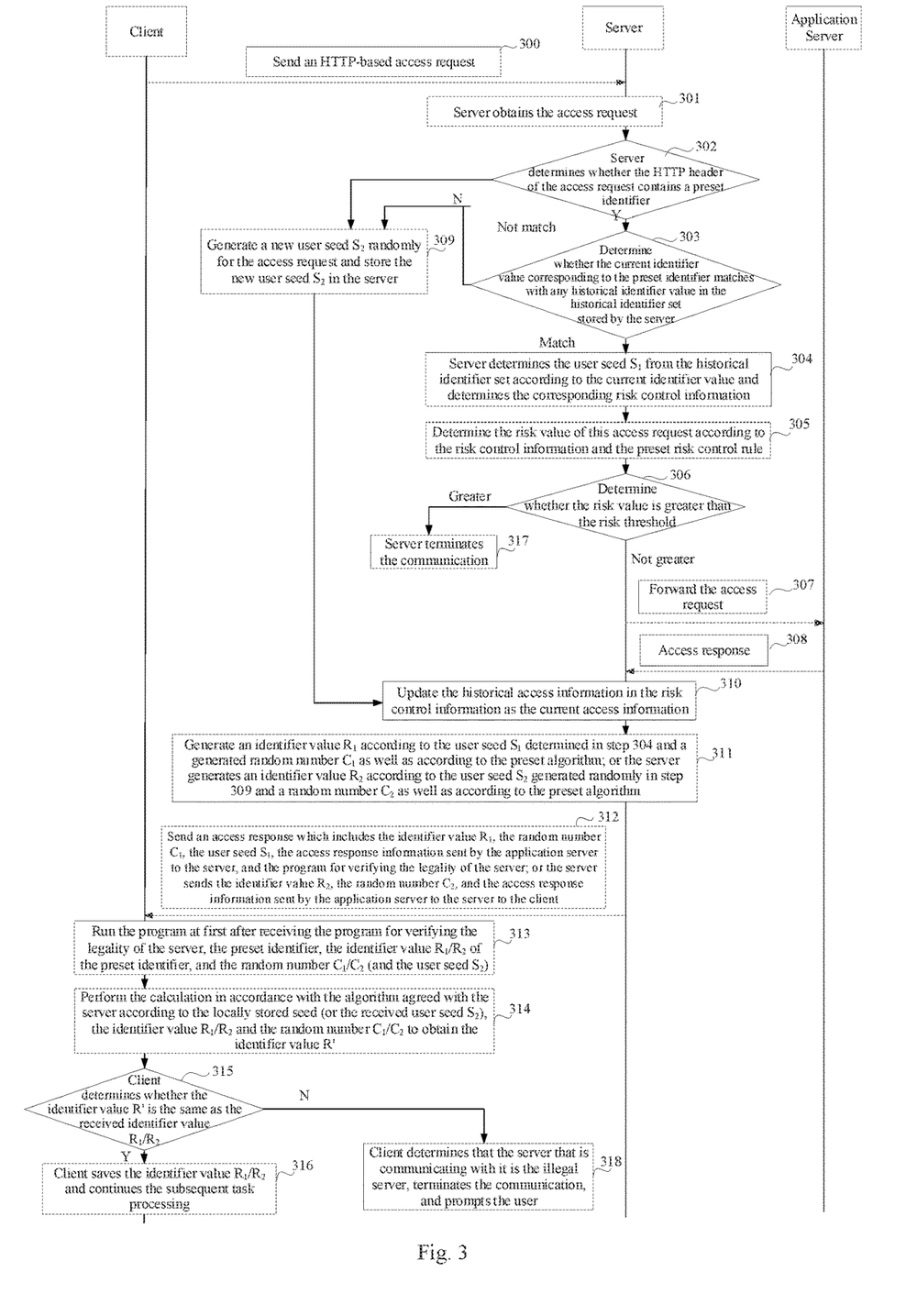
FIG. 3 is a schematic flow diagram of another user tracking method provided by an embodiment of the invention.

In order to introduce the above-mentioned method flow more clearly, FIG. 3 exemplarily illustrates another user tracking method provided by an embodiment of the invention. In the embodiment of the invention, the tracking of the risk value of the user's access request is still taken as an example.

For the HTTP protocol-based access request, the tracking of the access behavior of the user seed may be implemented uniformly at the mobile client, computer client and web client by adding a preset identifier in the HTTP header, and the access behavior of the user may be tracked accurately without increasing the technical complexity at the client and server. The user tracking process is described below.

As shown in FIG. 3, the method includes the following steps.

Step 300: a client sends an HTTP-based access request to a server.

Step 301: the server obtains the access request.

Step 302: the server determines whether the HTTP header of the access request contains a preset identifier; if so, perform step 303; if not, perform step 309.

Step 303: the server determines whether the current identifier value corresponding to the preset identifier matches with any historical identifier value in the historical identifier set stored by the server; if so, perform step 304; if not, perform step 309.

Step 304: the server determines the user seed $S_1$ from the historical identifier set according to the current identifier value and determines the corresponding risk control information.

Step 305: the server determines the risk value of this access request according to the risk control information and the preset risk control rule.

Step 306: the server determines whether the risk value is greater than the risk threshold; if not, perform step 308; if so, perform step 317.

Step 307: the server forwards the access request to an application server.

Step 308: the application server sends an access response to the server, where the access response includes the result of processing the access request by the application server.

Step 309: the server generates a new user seed $S_2$ randomly for the access request and stores the new user seed $S_2$ in the server.

Optionally, the form of the new user seed is 2e2324da-2c34-401c-b079-f652de8161e4.

Step 310: the server updates the historical access information in the risk control information as the current access information after receiving the access response sent by the application server or generating the user seed $S_2$.

Step 311: the server generates an identifier value $R_1$ based on the user seed $S_1$ determined in step 304 and a generated random number $C_1$ as well as according to the preset algorithm; or the server generates an identifier value $R_2$ based on the user seed $S_2$ generated randomly in step 309 and a random number $C_2$ as well as according to the preset algorithm.

Optionally, the algorithm may be R=HmacSHA1 (S, C) or another algorithm, where the algorithm needs to satisfy: C is an independent variable, the determined R is a unique value, and S and C cannot be inversely derived from R.

Optionally, for the two cases in step 311, one of the two cases is selected and performed according to the specific situation in the tracking of the user access behavior.

Step 312: the server sends an access response to the client, where the access response includes the identifier value $R_1$, the random number $C_1$, the user seed $S_1$, the access response information sent by the application server to the server, and the program for verifying the legality of the server; or the server sends the identifier value $R_2$, the random number $C_2$, and the access response information sent by the application server to the server to the client.

Optionally, when the identifier value $R_2$ and the random number $C_2$ is sent, the program for verifying the legality of the server may also be carried.

Optionally, the sent identifier value $R_1/R_2$ and random number $C_1/C_2$ as well as the seed may be inserted into the HTTP header, where $R_1/R_2$ represents $R_1$ or $R_2$; and $C_1/C_2$ represents $C_1$ or $C_2$. The formats of the user seed, random number, and identifier value may be:

T-FLAG-S=&&&&&; T-FLAG-C=xxxxxxxx; T-FLAG-R=********.

Optionally, if the new identifier value $R_2$ and the random number $C_2$ are generated according to the latter case in step 309, the server further needs to send the user seed $S_2$ to the client.

Step 313: the client runs the program at first after receiving the program for verifying the legality of the server, the preset identifier, the identifier value $R_1/R_2$ of the preset identifier, and the random number $C_1/C_2$ (and the user seed $S_2$).

Optionally, the client runs the program when determining that the response includes the preset identifier after receiving the response sent by the server.

Step 314: the client performs the calculation in accordance with the algorithm agreed with the server based on the locally stored seed (or the received user seed $S_2$), the identifier value $R_1/R_2$ and the random number $C_1/C_2$ to obtain the identifier value R'.

Step 315: the client determines whether the identifier value R' is the same as the received identifier value $R_1/R_2$, if so, perform step 316; if not, perform step 318.

Step 316: the client saves the identifier value $R_1/R_2$ and continues the subsequent task processing.

Optionally, if the client receives the response from the server based on the latter case in step 309, the user seed $S_2$ is stored locally.

Optionally, when the client communicates with the server next time, the saved identifier value $R_1/R_2$ is taken out, inserted into the Http header, and sent to the server together with other communication content.

Step 317: the server terminates the communication.

Step 318: the client determines that the server that is communicating with it is the illegal server, terminates the communication, and prompts the user.

As can be seen from the above, in the embodiments of the invention, when the server receives the HTTP protocol-based access request sent by the client and determines that the access request includes the preset identifier and the current identifier value corresponding to the preset identifier matches with any historical identifier value in the historical identifier set stored by the server, the server determines a user seed from the historical identifier set according to the current identifier value, where the historical identifier set includes the correspondence between historical identifier values and user seeds, and any historical identifier value is generated by the server based on the user seed corresponding to the historical identifier and a random number. Since the identifier value is generated based on the seed and the random number, the generated historical identifier value is also unique. An attacker cannot capture the identifier value, and it is difficult to falsify the user seed and thus difficult to falsify the access behavior of the user seed. Further, the user seed is used to identify the same user recognized by the server based on the access request, so the access behavior of the user corresponding to the user seed can be determined accurately by tracking the access behavior of the user seed.

Figure 4:
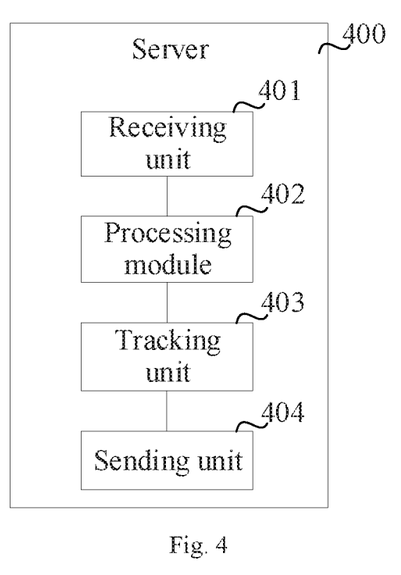
FIG. 4 is a structural schematic diagram of a server provided by an embodiment of the invention.

Based upon the same inventive concept, an embodiment of the invention further provides a server, which can perform the method embodiments described above. FIG. 4 is a structural schematic diagram of a server provided by an embodiment of the invention. As shown in FIG. 4, the server 400 includes a receiving unit 401, a processing module 402 and a tracking unit 403; and optionally, it further includes a sending unit 404, where:

the receiving unit is configured to receive an HTTP protocol-based access request sent by a client; the processing unit is configured to: when determining that the access request includes a preset identifier and the current identifier value corresponding to the preset identifier matches with a historical identifier value in the historical identifier set stored by the server, determine a user seed from the historical identifier set according to the current identifier value, where the historical identifier set includes the correspondence between historical identifier values and user seeds, any historical identifier value is generated by the server based on the user seed corresponding to the historical identifier value and a random number, and the user seed is used to identify the same user recognized by the server based on the access request; and the tracking unit is configured to track the access behavior of the user seed.

Optionally, the processing unit is further configured to: when determining that the preset identifier is not included in the access request or the current identifier value corresponding to the preset identifier mismatches with any historical identifier value in the historical identifier set, generate a new user seed randomly for the access request; generate the historical identifier value of the user seed based on the user seed and a random number; and add the user seed and the historical identifier value to the historical identifier set; and the server further includes a sending unit configured to: send an access response to the client, where the access response carries the preset identifier, the historical identifier value and the new user seed, and the historical identifier value is the value of the preset identifier.

Optionally, the processing unit is configured to: obtain the risk control information of the user seed, where the risk control information is obtained according to the historical access requests and the current access request; and determine the risk value of the access request of the user seed according to the risk control information.

Optionally, the processing unit is further configured to: generate a random number when determining that the risk value is not greater than the risk threshold; and calculate the random number and the user seed according to a preset algorithm to obtain a new historical identifier value corresponding to the preset identifier, where the preset algorithm satisfies: the calculated identifier values are not repetitive, and the seeds and random numbers cannot be inversely derived from the identifier values;

the sending unit is configured to: send an access response to the client, where the access response carries the preset identifier and the historical identifier value, and the historical identifier value is the value of the preset identifier.

Optionally, the sending unit is further configured to: send the program for verifying the legality of the server to the client, where the program includes: calculating the random number and the user seed according to the preset algorithm to obtain the identifier value corresponding to the preset identifier.

As can be seen from the above, in the embodiments of the invention, when the server receives the HTTP protocol-based access request sent by the client and determines that the access request includes the preset identifier and the current identifier value corresponding to the preset identifier matches with any historical identifier value in the historical identifier set stored by the server, the server determines a user seed from the historical identifier set according to the current identifier value, where the historical identifier set includes the correspondence between historical identifier values and user seeds, and any historical identifier value is generated by the server based on the user seed corresponding to the historical identifier and a random number. Since the identifier value is generated based on the seed and the random number, the generated historical identifier value is also unique. An attacker cannot capture the identifier value, and it is difficult to falsify the user seed and thus difficult to falsify the access behavior of the user seed. Further, the user seed is used to identify the same user recognized by the server based on the access request, so the access behavior of the user corresponding to the user seed can be determined accurately by tracking the access behavior of the user seed.

Figure 5:
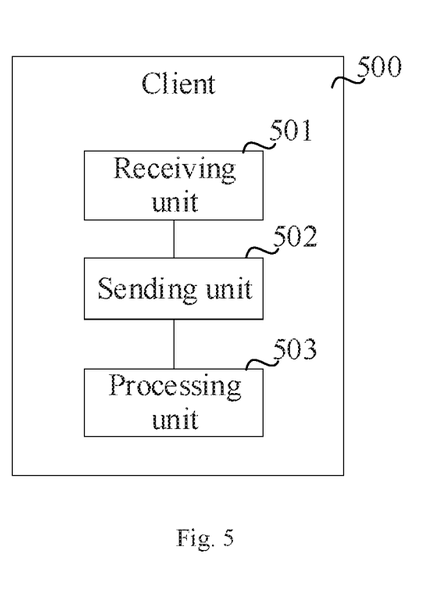
FIG. 5 is a structural schematic diagram of a client provided by an embodiment of the invention.

Based upon the same inventive concept, an embodiment of the invention further provides a client, which can perform the method embodiments described above. FIG. 5 is a structural schematic diagram of a client provided by an embodiment of the invention. As shown in FIG. 5, the client 500 includes a receiving unit 501 and a sending unit 502; and optionally, it further includes a processing unit 503, where:

the receiving unit is configured to receive an access response corresponding to the historical access request sent by a server, where the access response carries a preset identifier and a historical identifier value, and the historical identifier value is the value of the preset identifier; and the sending unit is configured to send an HTTP protocol-based access request to the server, where the access request includes the preset identifier and the current identifier value corresponding to the preset identifier, and the current identifier value corresponding to the preset identifier is the historical identifier value.

Optionally, the receiving unit is further configured to: receive the program for verifying the legality of the server sent by the server, where the program includes: calculating the random number and the user seed according to the preset algorithm to obtain the identifier value corresponding to the preset identifier;

the client further includes a processing unit configured to: run the program to obtain a new identifier value of the preset identifier; and verify that the server is legal when determining that the new identifier value is same as the received historical identifier value.

As can be seen from the above, in the embodiments of the invention, when the server receives the HTTP protocol-based access request sent by the client and determines that the access request includes the preset identifier and the current identifier value corresponding to the preset identifier matches with any historical identifier value in the historical identifier set stored by the server, the server determines a user seed from the historical identifier set according to the current identifier value, where the historical identifier set includes the correspondence between historical identifier values and user seeds, and any historical identifier value is generated by the server based on the user seed corresponding to the historical identifier and a random number. Since the identifier value is generated based on the seed and the random number, the generated historical identifier value is also unique. An attacker cannot capture the identifier value, and it is difficult to falsify the user seed and thus difficult to falsify the access behavior of the user seed. Further, the user seed is used to identify the same user recognized by the server based on the access request, so the access behavior of the user corresponding to the user seed can be determined accurately by tracking the access behavior of the user seed.

The above-mentioned embodiments may be implemented fully or partially by software, hardware, firmware, or any combination thereof. When implemented using a software program, they may be implemented fully or partially in the form of computer program product. The computer program product includes one or more instructions. When the computer program instructions are loaded and executed on a computer, the processes or functions according to the embodiments of the present application are generated fully or partially. The computer may be a general-purpose computer, a special-purpose computer, a computer network, or other programmable devices. The instructions may be stored in a computer storage medium or transmitted from one computer storage medium to another computer storage medium. For example, the instructions may be transmitted from one website, computer, server, or data center to another web site, computer, server or data center in a wired (e.g., coaxial cable, optical fiber, Digital Subscriber Line (DSL)) or wireless (e.g., infrared, wireless, microwave, etc.) way. The computer storage medium may be any available medium that can be accessed by a computer, or a data storage device such as server, data center and the like that includes one or more available media. The available medium may be a magnetic medium (e.g., floppy disk, hard disk, magnetic tape, Magnetic Optical disc (MO), etc.), an optical medium (e.g., CD, DVD, BD, HVD, etc.), or a semiconductor medium (e.g., ROM, EPROM, EEPROM, nonvolatile memory (NAND FLASH), Solid State Disk (SSD)) or the like. It should be understood by those skilled in the art that the embodiments of the present application can provide methods, systems and computer program products. Thus the embodiments of the present application can take the form of hardware embodiments alone, software embodiments alone, or embodiments combining the software and hardware aspects. Also the embodiments of the present application can take the form of computer program products implemented on one or more computer usable storage mediums (including but not limited to magnetic disk memories, CD-ROMs, optical memories and the like) containing computer usable program codes therein.

The embodiments of the present application are described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams may be implemented by the instructions. These instructions may be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device. These instructions may also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These instructions may also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the embodiments of the present application without departing from the spirit and scope of the present application. Thus the present application is also intended to encompass these modifications and variations therein as long as these modifications and variations to the embodiments of the present application come into the scope of the claims of the present application and their equivalents.

What is claimed is:

1. A user tracking method, comprising:
   receiving, by a server, a Hyper Text Transfer Protocol, HTTP, protocol-based access request sent by a client;
   in response to that the server determines that the access request comprises a preset identifier and that a current identifier value corresponding to the preset identifier matches with a historical identifier value in a historical identifier set stored by the server, determining, by the server, a user seed from the historical identifier set according to the current identifier value, wherein the historical identifier set comprises a correspondence between historical identifier values and user seeds, the historical identifier value is generated by the server based on a user seed corresponding to the historical identifier value and a random number, and the user seed is used to identify a same user recognized by the server based on the access request; and tracking, by the server, an access behavior of the user seed.

2. The method of claim 1, wherein after the server receives the access request sent by the client, the method further comprises:

generating, by the server, a new user seed randomly for the access request, in response to that the server determines that the preset identifier is not comprised in the access request or that the current identifier value corresponding to the preset identifier mismatches with any historical identifier value in the historical identifier set;

generating, by the server, a historical identifier value of the user seed based on the user seed and a random number;

adding, by the server, the user seed and the historical identifier value to the historical identifier set; and sending, by the server, an access response to the client, wherein the access response carries the preset identifier, the historical identifier value and the new user seed, and the historical identifier value is a value of the preset identifier.

3. The method of claim 1, wherein tracking, by the server, an access behavior of the user seed, comprises:

obtaining, by the server, risk control information of the user seed, wherein the risk control information is obtained according to historical access requests and a current access request; and determining, by the server, a risk value of the access request of the user seed according to the risk control information.

4. The method of claim 3, wherein, after the server determines the risk value of the access request of the user seed according to the risk control information, the method further comprises:

generating, by the server, a random number when determining that the risk value is not greater than a risk threshold;

calculating, by the server, the random number and the user seed according to a preset algorithm to obtain a new historical identifier value corresponding to the preset identifier, wherein the preset algorithm satisfies: calculated identifier values are not repetitive, and seeds and random numbers cannot be inversely derived from identifier values; and sending, by the server, an access response to the client, wherein the access response carries the preset identifier and the historical identifier value, wherein the historical identifier value is a value of the preset identifier.

5. The method of claim 4, wherein, before the server sends the new identifier value to the client, the method further comprises:

sending, by the server, a program for verifying legality of the server to the client, wherein the program comprises: calculating a random number and a user seed according to the preset algorithm to obtain an identifier value corresponding to the preset identifier.

6. A user tracking method, comprising:

receiving, by a client, an access response corresponding to a historical access request sent by a server, wherein the access response carries a preset identifier and a historical identifier value, and wherein the historical identifier value is a value of the preset identifier; and sending, by the client, an HTTP protocol-based access request to the server, wherein the access request comprises the preset identifier and a current identifier value corresponding to the preset identifier, and wherein the current identifier value corresponding to the preset identifier is the historical identifier value;

wherein, after the client receives the access response and before the client sends the HTTP protocol-based access request to the server, the method further comprises:

receiving, by the client, a program for verifying legality of the server sent by the server, wherein the program comprises: calculating a random number and a user seed according to a preset algorithm to obtain an identifier value corresponding to the preset identifier;

running, by the client, the program to obtain a new identifier value of the preset identifier; and verifying, by the client, that the server is legal when determining that the new identifier value is same as the received historical identifier value.

7. A user tracking server, comprising:

a receiving unit configured to receive an HTTP protocol-based access request sent by a client;

a processing unit configured to: in response to determining that the access request comprises a preset identifier and that a current identifier value corresponding to the preset identifier matches with a historical identifier value in a historical identifier set stored by the server, determine a user seed from the historical identifier set according to the current identifier value, wherein the historical identifier set comprises a correspondence between historical identifier values and user seeds, and the historical identifier value is generated by the server based on a user seed corresponding to the historical identifier value and a random number, and the user seed is used to identify a same user recognized by the server based on the access request; and a tracking unit configured to track an access behavior of the user seed.

8. The server of claim 7, wherein, the processing unit is further configured to:

in response to determining that the preset identifier is not comprised in the access request or that the current identifier value corresponding to the preset identifier mismatches with any historical identifier value in the historical identifier set, generate a new user seed randomly for the access request; generate a historical identifier value of the user seed based on the user seed and a random number; and add the user seed and the historical identifier value to the historical identifier set;

wherein a sending unit is comprised and configured to:

send an access response to the client, wherein the access response carries the preset identifier, the historical identifier value and the new user seed, and wherein the historical identifier value is a value of the preset identifier.

9. The server of claim 7, wherein, the processing unit is configured to:

obtain risk control information of the user seed, wherein the risk control information is obtained according to historical access requests and a current access request; and determine a risk value of the access request of the user seed according to the risk control information.

10. The server of claim 9, wherein, the processing unit is further configured to:

generate a random number when determining that the risk value is not greater than a risk threshold; and calculate the random number and the user seed according to a preset algorithm to obtain a new historical identifier value corresponding to the preset identifier, wherein the preset algorithm satisfies: calculated identifier values are not repetitive, and seeds and random numbers cannot be inversely derived from identifier values;

the sending unit is configured to:
send an access response to the client, wherein the access response carries the preset identifier and the historical identifier value, and wherein the historical identifier value is a value of the preset identifier.

11. The server of claim 10, wherein, the sending unit is further configured to:
send a program for verifying legality of the server to the client, wherein the program comprises: calculating a random number and a user seed according to the preset algorithm to obtain an identifier value corresponding to the preset identifier.

12. A user tracking client, comprising:
a receiving unit configured to receive an access response corresponding to a historical access request sent by a server, wherein the access response carries a preset identifier and a historical identifier value, and the historical identifier value is a value of the preset identifier; and a sending unit configured to send an HTTP protocol-based access request to the server, wherein the access request comprises the preset identifier and a current identifier value corresponding to the preset identifier, and wherein the current identifier value corresponding to the preset identifier is the historical identifier value;

wherein, the receiving unit is further configured to:
receive a program for verifying legality of the server sent by the server, wherein the program comprises: calculating a random number and a user seed according to a preset algorithm to obtain an identifier value corresponding to the preset identifier;

a processing unit is comprised and configured to:
run the program to obtain a new identifier value of the preset identifier; and verify that the server is legal in response to determining that the new identifier value is same as the received historical identifier value.

13. A computer readable storage medium, wherein, the computer readable storage medium stores computer executable instructions which are configured to cause the computer to perform the method of claim 1.

14. A computer device, comprising:
a memory configured to store program instructions; and
a processor configured to invoke the program instructions stored in the memory and perform the method of claim 1 in accordance with the obtained program.

* * * * *